April 6, 1937. E. C. HERRINGTON 2,076,404
PANEL AND JOINT CONSTRUCTION
Filed April 8, 1936
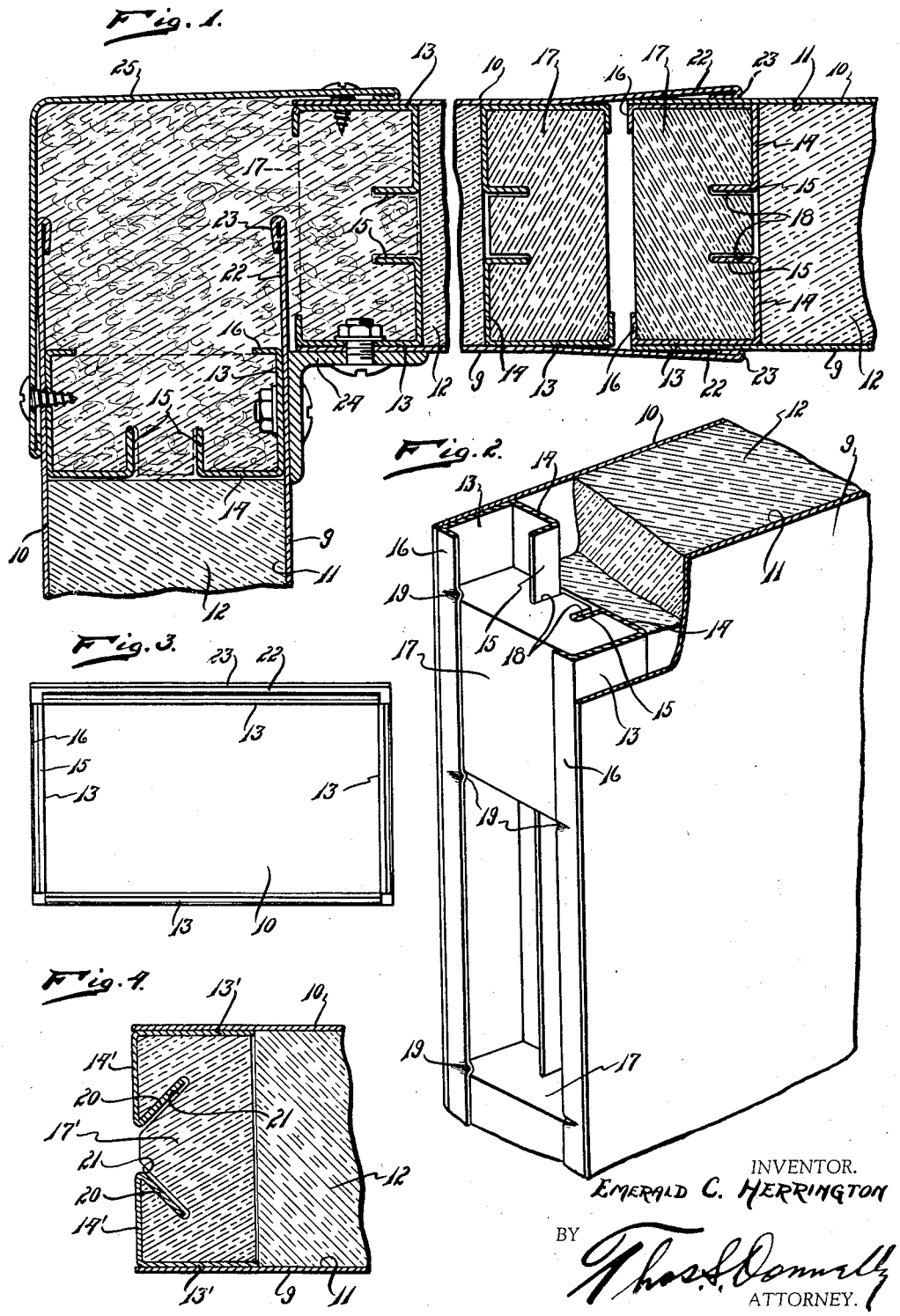
INVENTOR.
EMERALD C. HERRINGTON
BY
ATTORNEY.

Patented Apr. 6, 1937

2,076,404

UNITED STATES PATENT OFFICE

2,076,404

PANEL AND JOINT CONSTRUCTION

Emerald C. Herrington, Ferndale, Mich.

Application April 8, 1936, Serial No. 73,252

9 Claims. (Cl. 72—16)

My invention relates to a new and useful improvement in a panel and joint construction adapted for use in constructing panels of housings and the like in which a pair of metallic bodies are held in spaced relation to provide a space into which is deposited insulation in the nature of ground asbestos, rock wool, and the like.

The invention is particularly adapted for use in constructing the side walls, roofs, partitions, floors and the like of ovens, furnaces or similar housings, and particularly heat treating ovens. In the construction of ovens or housings and other similar devices in which panels embodying spaced metallic plates are used having the space therebetween filled with heat insulating material such as asbestos or the like, it is quite customary to connect the inner panel to the outer panel by means of metallic members, such as bolts, metal clips, or the like with the result that considerable heat conduction takes place through such connecting means and the efficiency of the insulated panels or housings thus impaired.

It is an object of the present invention to provide a construction having a pair of spaced plates with the space therebetween filled with insulating material connected together in such a manner that heat transference from one plate to the other is not facilitated by metallic or metallic insulated connecting means.

Another object of the invention is the provision in a construction of this kind of spaced plates connected together by connectors which are poor heat conductors.

Another object of the invention is the provision in a construction of this kind of a pair of spaced plates having heat insulating material deposited therebetween and connected together by insulating members.

Other objects will appear hereinafter.

The invention consists in the combination and arrangement of parts hereinafter described and claimed.

The invention will be best understood by a reference to the accompanying drawing which forms a part of this specification, and in which, Fig. 1 is a fragmentary, sectional view through a construction embodying the invention.

Fig. 2 is a fragmentary, perspective view of a construction embodying the invention with parts broken away and parts shown in section.

Fig. 3 is a plan view of one of the panel forming plates.

Fig. 4 is a fragmentary, sectional view showing a slightly modified form of connector.

In Fig. 1 I have illustrated the invention used with an oven and have indicated a connection which is adaptable for use on the walls, floors, partitions and roofs and also at a corner.

In Fig. 2 a fragmentary view of the panel is shown and as the various parts appear in all of the figures like reference numerals will be used on all figures. On opposite sides of the panel construction are provided metallic plates 9 and 10 having a space 11 between the same in which suitable insulating material 12, such as rock wool, asbestos, or the like is deposited to fill the space. Secured on the inner face of each of the plates is an elongated retaining clip comprising the portion 13 which is welded, soldered, or otherwise suitably secured to the inner face of the plate with which used. The inner portion of this body 13 is turned inwardly to provide the inwardly projecting flange 14 terminating in the outwardly directed flange 15. The outer edge of the body 13 is turned inwardly to provide the inwardly directed flange 16. The retainer comprises a block 17 of insulating material having the slots 18 formed in one of the faces, these slots being adapted for receiving the flanges 15. This block 17 is of rigid material and sufficiently strong to serve as a connecting member and the outer face thereof engages the inner face of the flange 16 which is pressed inwardly to provide the locking bodies or shoulders 19 at opposite sides of the block 17. In this way the panels 9 and 10 are securely held together and they are not connected by a metallic or metallic insulated member. The body 13, together with the flanges 14, 15 and 16, serve as guide members for the movement of the block 17 longitudinally of the bodies 13 to the desired position, as many of these blocks 17 being used as desired. The blocks 17 may, of course, be of any width desired so that instead of constituting blocks they may be formed in the nature of elongated strips. As shown in Fig. 2 the blocks are spaced from each other and the distance of their spacing will, of course, depend upon the strain to which these blocks are put.

In Fig. 4 I have shown welded or otherwise suitably secured to the inner face of the plate 9 and also the plate 10 a body or plate 13' having its outer edge turned to form the flanges 14' which is terminated in the angularly directed flange 20, these flanges engaging in the slots 21 which are formed in the block 17'. In the form shown in Fig. 4 it is obvious that the member 13' with the angularly turned flanges 14' and 20 really constitute an extension of the side plates 9 and 10. Consequently, it is obvious that the portion 13' might be omitted and the flanges 14' and 20 formed from a part of the side plate itself.

In Fig. 1 I have shown a pair of the plates 9 and 10 abutted together and to this end I provide an outwardly projecting portion 22 which overlaps the adjacent end of the adjacent section and which may or may not have the end doubled-over as at 23 to overlap the corresponding part and thus form a joint. In the corner construction I provide an angle iron 24 which is bolted to the plates and clips as shown in Fig. 1 and the outer corner is closed by the L shaped plate 25 which is screwed to the panels to join these parts together in position.

While I have illustrated and described the preferred form of construction, I do not wish to limit myself to the precise details of structure shown, but desire to avail myself of such variations and modifications as may come within the scope of the appended claims.

Having thus described my invention, what I claim as new and desire to secure by Letters Patent is:

1. In a construction of the class described, a pair of spaced metallic plates; friable insulating material packed in the space between said plates; and spaced rigid insulating means for connecting said plates together, said plates being free from metallic interconnections.

2. In a construction of the class described, a pair of spaced metallic plates; loose insulating material packed in the space between said plates; and spaced rigid insulating means positioned between and connecting said plates together and serving as the sole means of interconnection.

3. In a construction of the class described, a pair of spaced metallic plates; loose heat insulating material packed between said plates; rigid insulating connecting members positioned between said plates at spaced intervals; and means carried by each of said plates for engaging the connecting members for securing said plates together, said last named means and said insulating connecting members serving as the sole means of interconnection between said plates, said plates being free from metallic interconnections.

4. In a construction of the class described, a pair of spaced metallic plates; heat insulating material packed between said plates; an inwardly projecting flange bearing member on each of said plates; and a rigid insulating member engageable with the flange bearing members on each of said plates for connecting said plates together.

5. In a construction of the class described, a pair of spaced metallic plates; heat insulating material packed between said plates; elongated flange bearing members mounted on the inner faces of each of said plates, the flange bearing member on one plate opposing the flange bearing member on the opposite plate; and a rigid insulating member having slots formed therein for reception of the flanges on said flange bearing members for connecting said plates together.

6. A construction of the class described, comprising: a pair of spaced metallic plates; heat insulating material packed between said plates; a gripping member mounted on the inner face of each of said plates; and a rigid insulating connecting member having a portion cut away for reception of said gripping member for connecting said plates together.

7. In a construction of the class described, a pair of spaced metallic plates; heat insulating material packed between said plates; flange bearing members carried by each of said plates and projecting inwardly of the inner face thereof; and a rigid insulating connecting member positioned between said plates and having a cut away portion for the reception of the flange of each of the flange bearing members for connecting said plates together.

8. In a construction of the class described, a pair of spaced metallic plates; heat insulating material packed between said plates; flange bearing members carried by each of said plates and projecting inwardly of the inner face thereof; a rigid insulating connecting member positioned between said plates and having a cut away portion for the reception of the flange of each of the flange bearing members for connecting said plates together; and means on each of said flange bearing members for preventing relative movement of the flange bearing members thereto.

9. In a construction of the class described, a pair of spaced metallic plates adapted for the reception of heat insulating material in the space between the same; rigid insulating members positioned between said plates, said members having a cut away portion; and gripping means carried by each of said plates engageable in said cut away portion and connecting said plates together through the medium of said rigid insulating members.

EMERALD C. HERRINGTON.